May 9, 1939.  H. E. GRAY  2,157,604
FRUIT AND VEGETABLE DICING APPARATUS
Filed Dec. 26, 1935  4 Sheets-Sheet 1
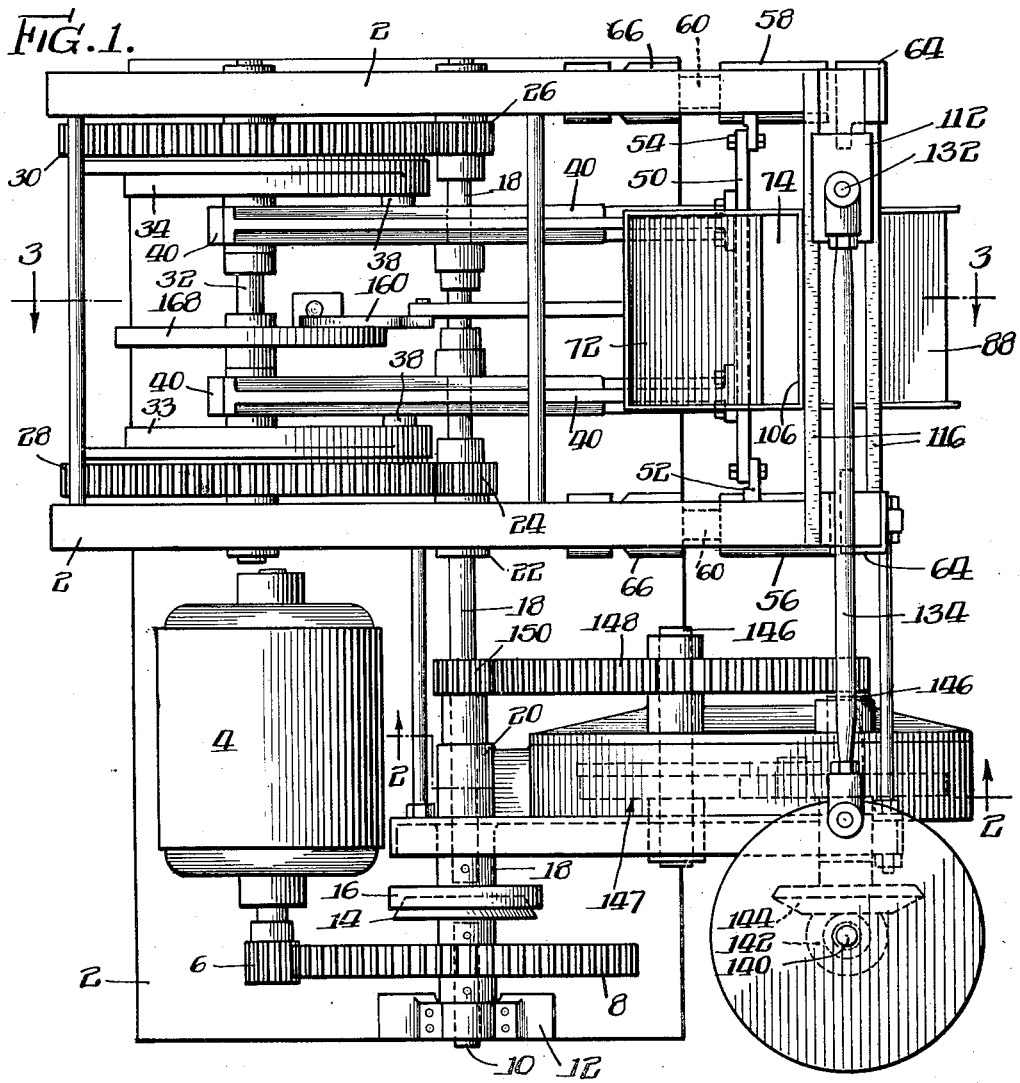
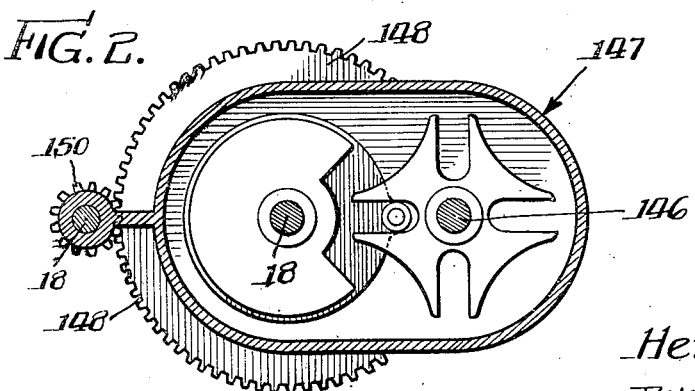
Inventor:
Herbert E. Gray
By: Cox & Moore attys.

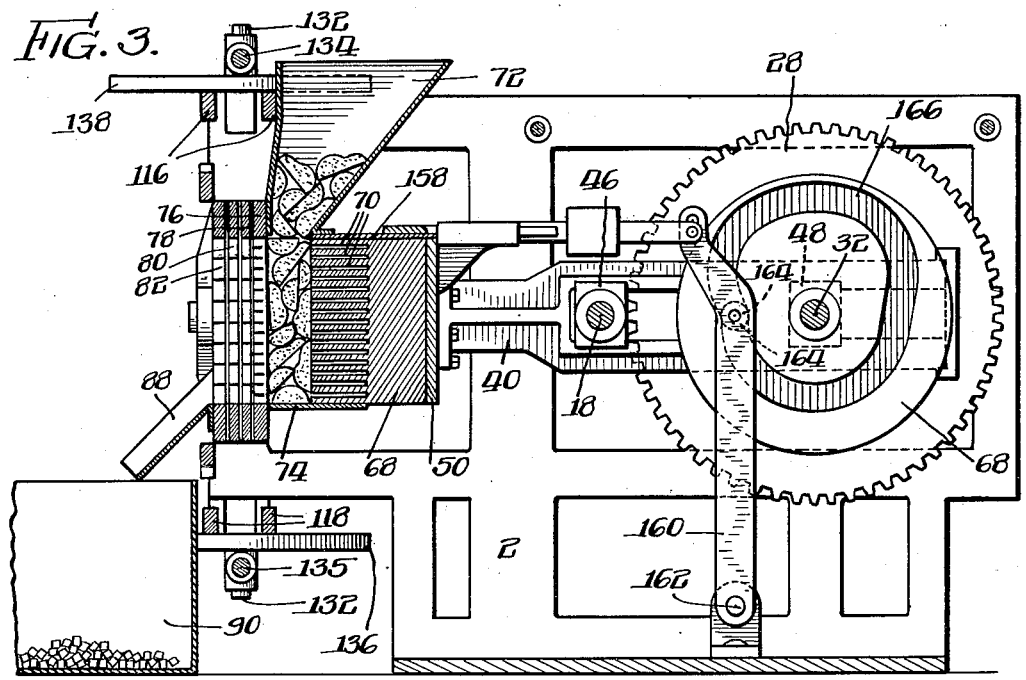
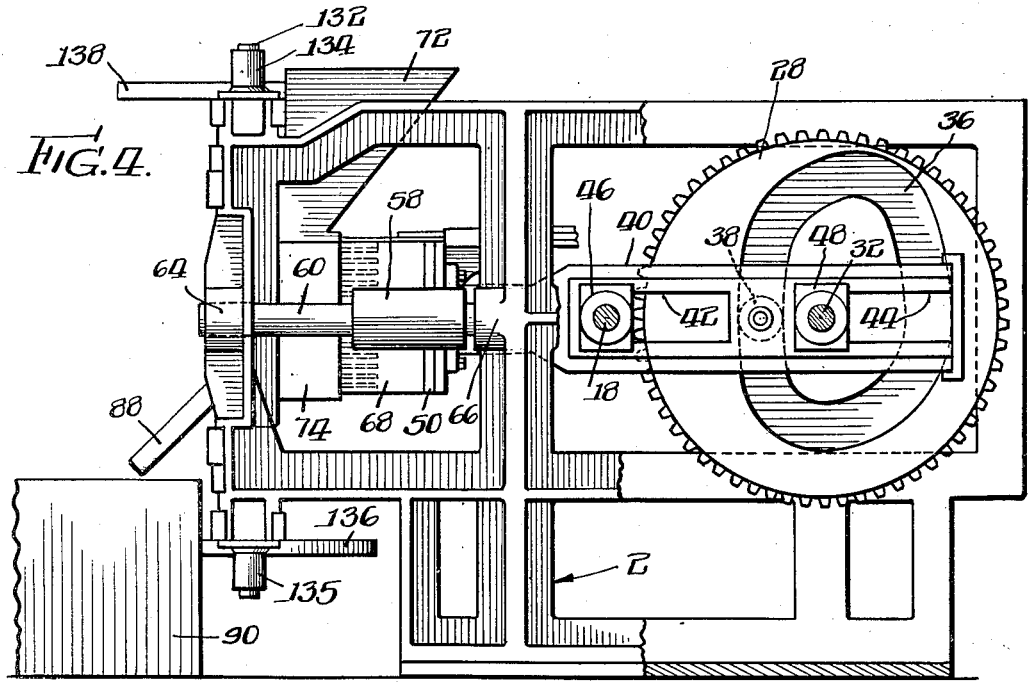

May 9, 1939.  H. E. GRAY  2,157,604
FRUIT AND VEGETABLE DICING APPARATUS
Filed Dec. 26, 1935  4 Sheets-Sheet 3
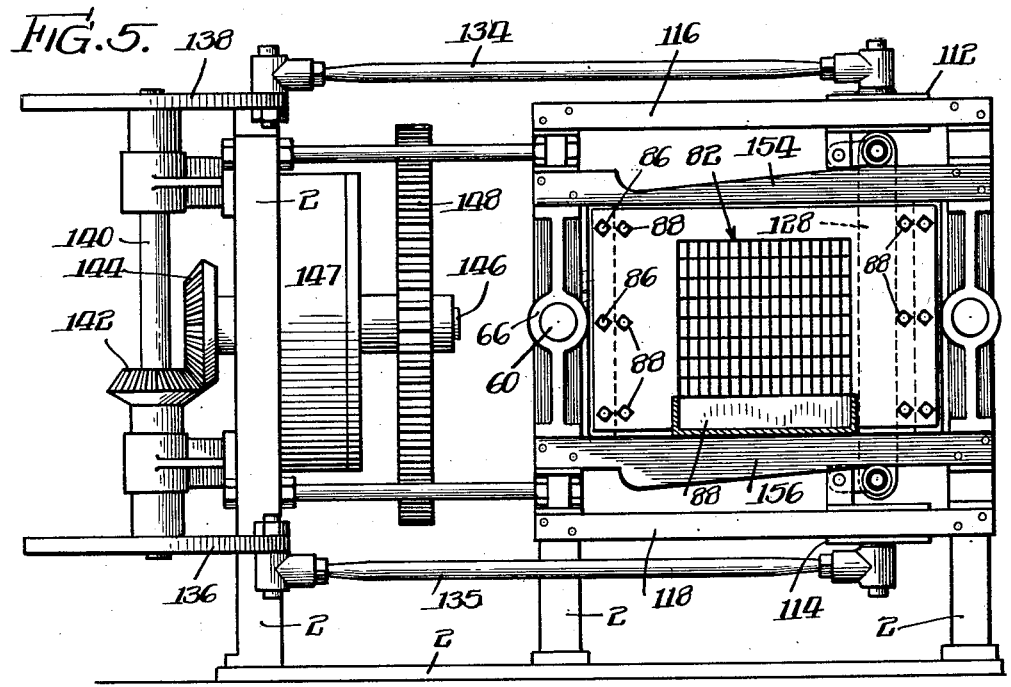
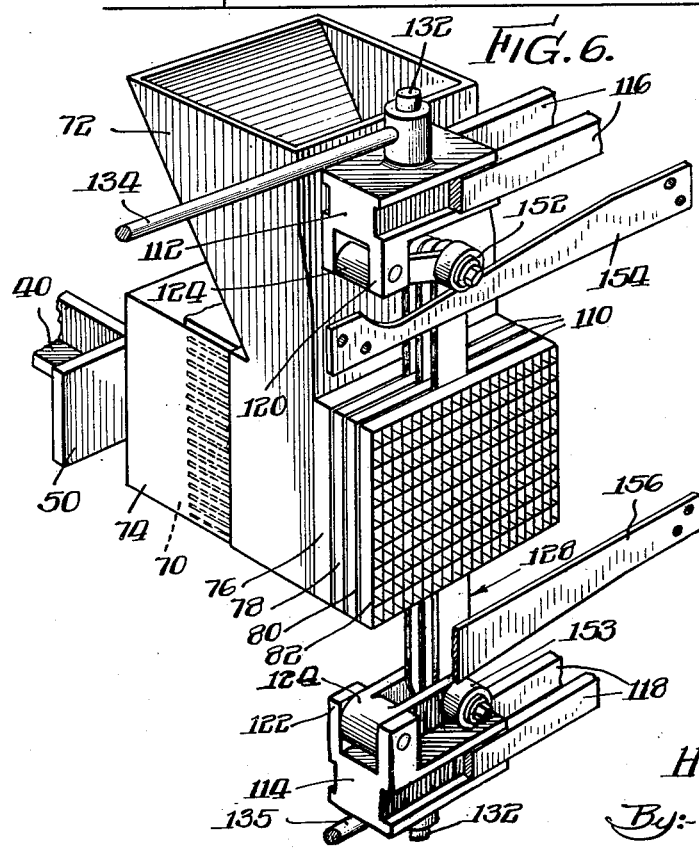
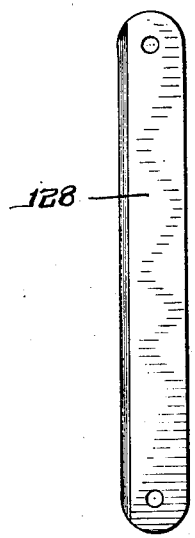
Inventor:-
Herbert E. Gray
By:- Cox & Moore attys May 9, 1939.  H. E. GRAY  2,157,604
FRUIT AND VEGETABLE DICING APPARATUS
Filed Dec. 26, 1935  4 Sheets-Sheet 4
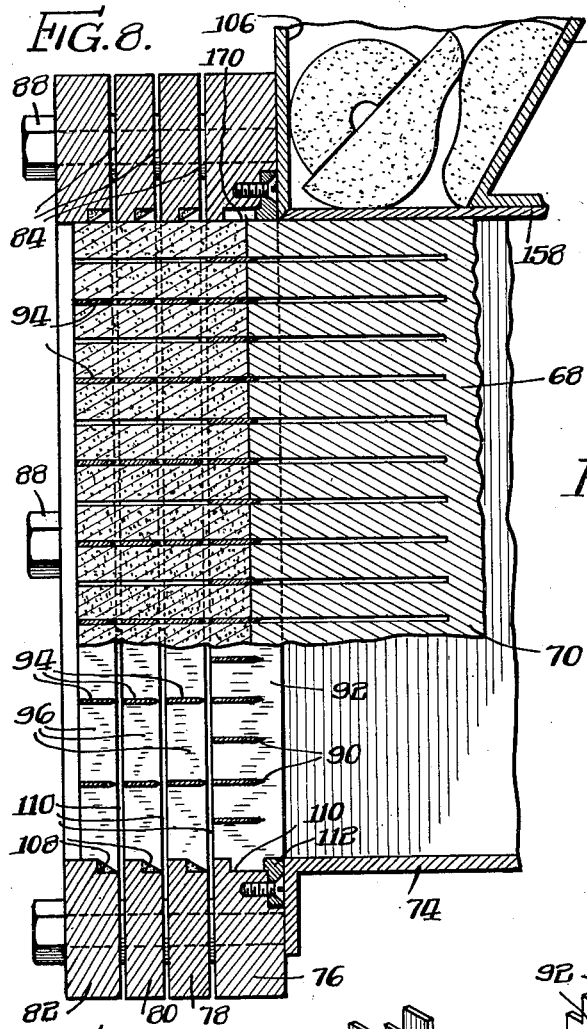
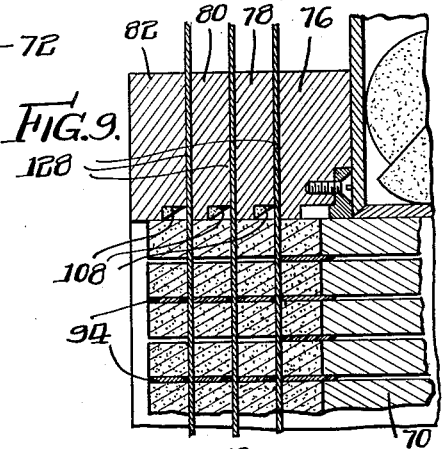
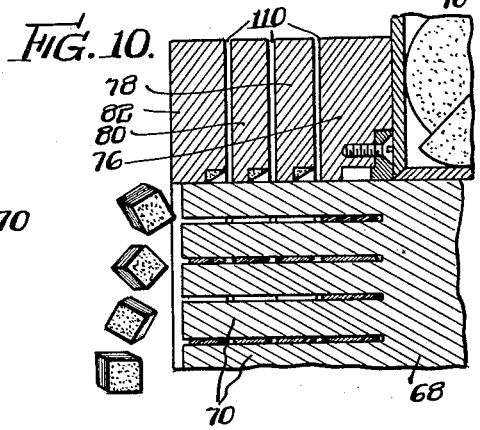
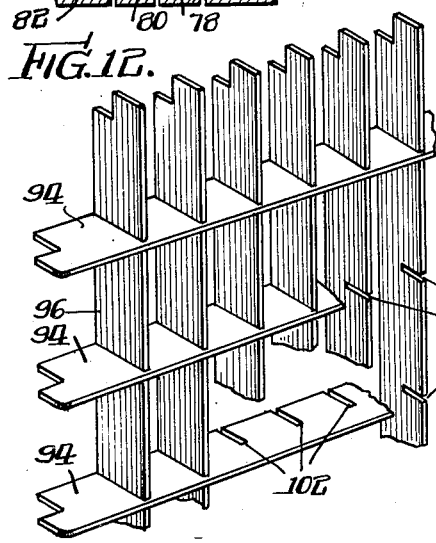
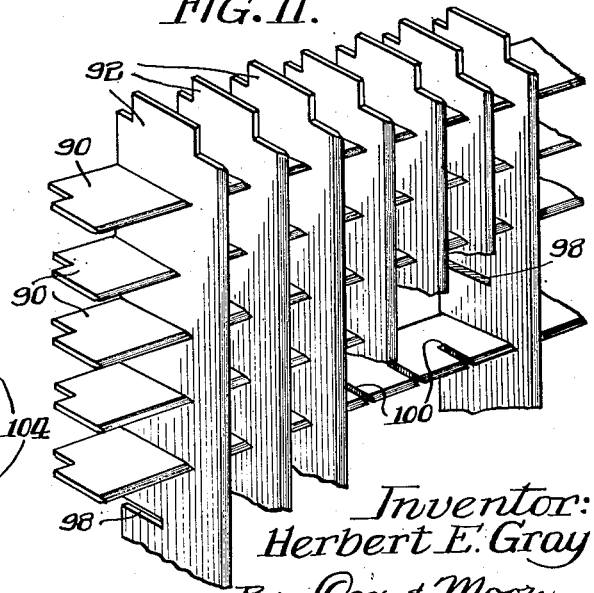
Inventor:
Herbert E. Gray
By: Cox & Moore attys Patented May 9, 1939

2,157,604

UNITED STATES PATENT OFFICE 2,157,604

FRUIT AND VEGETABLE DICING APPARATUS

Herbert E. Gray, San Jose, Calif.

Application December 26, 1935, Serial No. 56,210

23 Claims. (Cl. 146—78)

My invention relates to a machine for dicing fruit and vegetables and similar materials.

Among the objects of my invention are to provide a device for cutting relatively large quantities of fruit or vegetables into cubes or other symmetrically shaped pieces in a quick and substantially continuous operation; to provide a dicing machine wherein a relatively large number of fruit or vegetable sections such as half peaches and half pears or the like may be fed in indiscriminate arrangement and in relatively large numbers to the dicing dies and wherein means is provided first for cutting the fruit or vegetable sections into relatively long columns and for then cutting each of the columns into a plurality of cubes and other uniformly symmetrical shapes; to provide a dicing machine of large capacity capable of dicing a substantially continuous flow of a multiple number of pieces of fruit or vegetables; to provide a dicing machine wherein the plunger mechanism and the dies may be interchanged whereby to produce dies of different shapes and sizes; to provide a dicing machine wherein the material to be diced is forced through stationary cutting dies with the minimum of frictional resistance and with the minimum of tearing of the fruit or vegetable material being forced therethrough; to provide a dicing machine wherein the material is fed from a hopper and wherein certain of the dies are extended parallel with the line of material fed into pre-dicing position and are ranged to project in advance of other cutting dies disposed normally thereto so as to present the minimum resistance to the material as it is fed into dicing position from the hopper; to provide stationary dicing dies through which material is adapted to be forced providing a very rugged construction to withstand the pressure exerted by the plunger mechanism; to provide a die construction wherein certain of the dies are arranged one back of the other in registration to provide columnar spaces through which material is forced to be formed into elongated columns of material for subsequent cross slicing into cubes or other forms and wherein alternate die members are omitted from the rearmost dies in order to cut down frictional resistance; to provide a dicing machine which is adapted to release in case a hard foreign object is caught between the plunger and the cutting dies; to provide a dicing machine wherein the cross slicing knife or knives are given a sliding or slicing movement in addition to the transverse cutting movement; to provide a dicing machine of the character wherein a plunger forces the material to be diced through stationary cutting dies and wherein the plunger in its initial position is adapted to project partly into the first die whereby to space the material equidistantly in the dies or cutting off cubes of uniform width.

Other objects and advantages of the invention will be apparent from a perusal of the following specification taken in connection with the accompanying drawings in which:

Figure 1 is a plan view of a dicing machine constructed in accordance with the principles of my invention;

Figure 2 is a section on line 2—2 of Fig. 1 showing the Geneva movement mechanism;

Figure 3 is a vertical cross-sectional view taken on line 3—3 of Figure 1 showing the plunger in retracted position;

Figure 4 is a front elevation with a portion of the frame broken away to show the interior construction;

Figure 5 is a front elevation;

Figure 6 is a perspective view of the feed hopper, the cutting dies and the cutting knives;

Figure 7 is a front view of one of the cutting or slicing knives;

Figure 8 is a sectional view of the plunger and die assembly showing the plunger advanced to the position at which time the cutting operation takes place;

Figure 9 is a sectional view showing cutting knives in operation;

Figure 10 is a view showing the plunger advanced to expel the diced material;

Figure 11 is a perspective view of a portion of the first cutting die;

Figure 12 is a perspective view of a portion of the intermediate dies.

Referring now to the drawings in detail, the machine in general comprises a substantially box-like frame 2 with a base portion and a plurality of uprights. A prime mover comprising a motor 4 is mounted upon the base at a suitable point and is provided with a pinion 6 for driving a gear 8 which is mounted on a shaft 10 having its bearings 12 on the base 2. This shaft 10 terminates in one portion of a friction clutch 14 which is drivingly connected to another portion 16 of the friction clutch fixed upon the end of a shaft 18 disposed in alinement with the shaft 12 and having additional bearings 20 and 22 on the base. This shaft 18 extends clear across the base 2 and is provided with sufficient bearings at its opposite end. This power driven shaft 18 is provided with means for operating a reciprocating plunger and is also provided with means for operating a Geneva movement for periodically operating in synchronism with the plunger material slicing means hereinafter described.

The plunger mechanism hereinafter described is adapted to reciprocate through a honeycomb arrangement of hollow cutters and dies arranged in any desired manner to produce in cooperation with the slicing knives, diced material. Means for reciprocating the plunger into and out of the cutting dies comprises two pinions 24 and 26 fixedly mounted to rotate with shaft 18. These pinions in turn drive respectively large gears 28 and 30 mounted upon a shaft 32 having its bearings on the side frame 2 of the base. Attached to the side of each one of the gears 28 and 30 are cams 33 and 34 which rotate with the gears. The cam is preferably formed as a cam track 36 in which is positioned a roller 38 (see Figure 4), which roller in turn is connected to a connecting rod 40. Inasmuch as the two connecting rods 40 and their driving devices are similar, only one has been described. Movement of the cam 36 will reciprocate the connecting rods 40. Each connecting rod has cut-out portions 42 and 44 adapted to receive bearing blocks 46 and 48 which are mounted on the shafts 18 and 32 respectively whereby these blocks guide the connecting rods 40 in their reciprocations. At the front end of the connecting rods 40 is fixed a transversely extending plate 50 having a bolted connection 52 and 54 with two opposed sleeves 56 and 58. Each of these sleeves is adapted to slide upon a guide rod 60 having its opposite ends in bearings 64 and 66 on the frame 2. By means of this construction the reciprocation of the plunger is positively guided and its exact entrance into and from the die spaces is assured. The cross-plate 50 has detachably bolted thereto the plunger head 68, the front portion of which is provided with a plurality of plunger fingers 70 of desired cross-sectional shape. These plunger fingers are formed of a predetermined depth to cooperate with the spaces between the cutters, not only for the purpose of feeding the material from the hopper to the chamber immediately in front of the cutting dies but also positively to force the material through the cutting dies and thence to eject the diced material after the same has been cut. By providing interchangeable plunger heads having plunger fingers of variant cross-sectional shape to cooperate with correspondingly shaped cutting dies, any form of diced material or any size of diced material may be provided. In the present instance the plunger fingers in cross-section are formed as elongated rectangles to cooperate with similarly formed spaces between the cutting knives as will hereinafter appear.

Cooperating with the plunger is provided a feed hopper 72 and a housing 74 in which the plunger 68 reciprocates. This housing 74 in conjunction with the dies forms a material receiving chamber into which the material is preferably fed by gravity from the hopper 72 in the position in the front of the cutting dies and is of such capacity that a mass of material from the hopper, such as sections of peaches, pears, fruits or vegetables, in the present instance preferably half peaches or half pears, may be fed in indiscriminate arrangement in order to be forced by the plunger through the dies.

The die or cutting mechanism is formed of a plurality of rigid die frames 76, 78, 80 and 82 which are fastened in spaced apart relation. The front frame 82 is fastened to the main frame 2 by a series of bolts 86 extending through the front side thereof, the other frames 76, 78, and 80 being supported on bolts or studs 88, preferably fixed to the front frame 82. The various frames are rigidly held in spaced apart relation by means of spacing washers 84 of predetermined width. The rear frame 76 covers the front side of the housing 74. Of the frames, frame 76 is provided with two sets of fixed cutter blades 90 and 92, the cutter blades 90 being preferably disposed in horizontal position and the cutter blades 92 being preferably disposed in vertical relation. It is understood, of course, that any desired arrangement of angular relation between these cutter blades may be utilized to provide dice shapes of predetermined cross-sectional formation and size. In addition, each of the frames 78, 80 and 82 are provided with two sets of guide blades 84 and 86 which are arranged to register with the cutter blades 90 and 92 of the first frame 76. The blades 90 and 92, and likewise the guide blades 94 and 96, are slotted as at 98, 100, 102, and 104 at spaced points throughout the length thereof whereby the vertical and horizontal blades and guides will form half-lap joints with each other by the interlocking kerfs in the respective blades and guides. Thus the space enclosed by each of the frames is divided into a plurality of column-like spaces, the vertical and horizontal blades in the front frame and the vertical and horizontal blades in the rear frame are all in horizontal and vertical alinement with each other so that material passing through the cutting and guiding blades will be discharged on the same plane as that of its entry into the cutting dies. The edges of the blades 90 and 92 adjacent the housing 74 are sharpened to provide keen cutting edges. The edges of the other blades may be somewhat sharpened if desired or may be left unsharpened since their function is mainly to guide the material once it is cut by the edges of the cutting blades. Obviously, if desired, the edges of these other guides may be keenly sharpened but this is not necessary.

In order to cut down the resistance of the materials passing through the guides 94 and 96 it has been found desirable to omit each alternate horizontal blade from the frames 78, 80 and 82, retaining each vertical blade. It has been found necessary to retain the vertical blades in order to offset the lateral pressure created by the slicing knives hereinafter referred to. In addition, by omitting each alternate horizontal guide a cleaner cut is assured.

It will be noted that the vertical cutting knives are formed much wider than the horizontal cutting knives and are arranged to project substantially into the vertical plane of the front wall 106 of the hopper chamber 74. These front knives will guide the material downwardly without the material coming into contact with the horizontal knives which would tend to overcome resistance and impede the down feed of the material into the chamber 74.

It will also be noted that by forming the cutter knives of greater width than the guiding members 94 and 96, I have been able to provide greater strength in the cutting knives 90 and 92 in order to resist better the compressive force of the plunger 68. By making the blades wider, I increase the width beyond the interfitting slots formed in the vertical and horizontal knives 90 and 92 and thereby give the additional strength.

In each of the frames 78, 80 and 82 I have provided a shouldered recess 108 around the inner wall thereof into which the ends of the guides are adapted to seat, the blades being held in place by soldering or welding or in any other desirable manner. In a similar way, the frame 78 is provided with a shoulder 110 into which the cutting blades 90 and 92 are seated, the same being held in place by a ring 112 bolted into the frame 76. If desired, any arrangement may be availed for detachably fastening and holding the cutting blades and the guides in their respective frames.

Means is provided for cutting simultaneously all of the columns of material forced by the plunger through the horizontal and vertical cutting blades and guides into predetermined smaller, preferably symmetrical, shapes. This means preferably comprises a plurality of spaced apart slicing knives constructed and arranged to reciprocate in the spaces 111 between the cutter and guiding frames. While any desired type of slicing means may be provided, I prefer to use the reciprocating type and to this end I have provided upper and lower grooved blocks 112 and 114 adapted to slide in horizontally disposed, parallel guides 116 and 118 respectively. Each one of these guides is provided with a furcation 120 and 122. Each of these furcations provides a pivotal mounting for a swinging bracket 124 which at its outer end pivotally carries a plurality of spaced apart slicing blades 128. In the present instance there are three in number, one for each of the spaces 111 formed between the four guiding and cutting frames 76, 78, 80, and 82. It is obvious that any number of frames and any number of slicing knives may be utilized. Each slidable block 112 and 114 is provided with an upstanding stud 132 forming a pivotable mounting for a connecting rod 134 or 135. The opposite ends of the connecting rods are pivotally mounted on the periphery of a disc 136 and 138, fixedly mounted on the end of a shaft 140 adapted to be driven by a bevelled gear 142, in turn driven from a gear 144 driven from shaft 146 by the Geneva movement illustrated in particular in Figure 2. This Geneva movement is of the ordinary construction and is designed to reciprocate the slicing knives in synchronized movement with the plunger. The Geneva movement 147 in general is driven by a large gear 148 in turn driven by pinion 150 on shaft 18.

In addition, each of the swinging brackets 124 is provided at its outer end with rollers 152 and 153 adapted to roll along two cam ways 154 and 156 having a cam track for producing a longitudinal slicing movement to the slicing knives in addition to their reciprocative travel. The movement of the slidable blocks 112 and 114 by the Geneva gearing 147 is such that the knives will be reciprocated from one side of the dies, as shown in Figure 5, quickly across the spaces between the dies and transversely of the columns of material therein to completely sever all of the columns, the knives occupying a position on the opposite side completely clear of all of the dies at which time the knives will remain in such position during the expulsion of the material, as shown in Figure 10, and during the retraction of the plunger, and will then subsequently move in an opposite direction across the dies in a complete cycle as hereinafter described.

If desired, I may utilize a cut-off shutter 158 mounted to slide above the plunger head 68 to cut off communication between the hopper 72 and the chamber 74. This cut-off mechanism is operated by means of an arm 160, see Figure 3, pivoted to the frame at 162 and having a roller 164 operating in a cam groove 166 on a cam disc 168 fixed on the shaft 32. I have found, however, that this shutter member is not necessary to the successful operation of my dicing machine.

The relation between the length of the plunger fingers 70, the reciprocation of the plunger head 68, the cutting blades 90 and 92, the guide blades 94 and 96, and the slicing knives 128 and the operating mechanism therefor is set to operate in a predetermined manner and in a predetermined sequence. For instance, with respect to Figure 3, it will be noted that the distance between the outer face of the plunger fingers 70 in retracted position and the cutting edges of the die in the first frame 76 is selected for the capacity of the entire dies so that the entire contents of the hopper 72, when the plunger 68 is retracted, will flow by gravity into the hopper housing or chamber 74 completely to fill the latter with the material to be diced. It will also be noted that when the plunger moves from retracted position forwardly, it enters the first die section, a distance adjustably selected so that the material which has been fed into the hopper chamber will be forced through the cutting dies and guides, a distance indicated in Figure 8, so that the cubes to be cut in the first frame 76 will be substantially the same width as all the cubes produced by the subsequent dies. In other words, the front edge of the plunger fingers will take up a position 170 (see Figure 8) so that the material extending from the front face of the plunger fingers 70 to the rearmost face of the cutting blades in the frame 76 will be exactly the same as the width of the material in each guiding die of the subsequent frames 78, 80 and 82. When the plunger stops in this position and the slicing knives are then automatically reciprocated across all of the dies in the spaces 111 between the frames 76, 78, 80 and 82, as shown clearly in Figure 9, the material will be cut into uniformly shaped cubes, as shown clearly in Figure 9. The slicing knife will then stop after it has completed a single traverse of the cutting dies and will stop on the opposite side or a completely lateral position, as shown in Figure 5, at which the plunger will then resume its forward travel to position shown in Figure 10 wherein all of the diced material will be expelled or discharged from the dies and the cubed material will fall down the chute 88 onto a conveyor or container 90. At this point the plunger will then retract completely to the position shown in Figure 3 where additional material from the hopper will then feed by gravity downwardly to fill the hopper chamber 74. When this is accomplished the plunger will then move forwardly again as hereinbefore described.

It will be obvious that either by changing the cutting blades and guide blades and by changing the plunger head and the projecting plunger fingers the material may be cut so as to produce a uniformity of sizes and shapes.

This application is a continuation in part of applicant's co-pending application filed March 14, 1933, serially numbered 660,616, and entitled Fruit and vegetable dicing machine.

Changes may be made in the form, construction, and arrangement of the parts without departing from the spirit of the invention or sacrificing any of its advantages, and the right is hereby reserved to make all such changes as fairly fall within the scope of the following claims.

Having thus described my invention, what I claim as new and desire to secure by Letters Patent is:

1. A dicer comprising a plurality of rows of fixed cutting blades arranged in spaced parallel relation having the spaces within the fixed cutting blades entirely unobstructed, means to support an article to be cut on one side of said blades, a plunger to force the article to be cut into the unobstructed spaces within the cutting blades to thereby cut said article into column-like sections, and knives positioned in the spaces between the fixed cutting blades and movable transversely thereacross to cut the column-like sections of the article into cubes without obstructing the subsequent movement of the articles through the fixed cutting blades.

2. A dicer comprising a plurality of rows of fixed cutting blades arranged in spaced parallel relation having the spaces within the fixed cutting blades entirely unobstructed, means to support an article to be cut on one side of said blades, a plunger to force the article to be cut into the unobstructed spaces within the cutting blades to thereby cut said article into column-like sections, knives positioned in the spaces between the fixed cutting blades and movable transversely thereacross to cut the column-like sections of the article into cubes, without obstructing the subsequent movement of the articles through the fixed cutting blades, and means to reciprocate the movable cutting knives during their transverse movement.

3. A dicer comprising a plurality of fixed cutting blades arranged in spaced parallel relation, means to support an article to be cut on one side of said blades, a plunger to force the article to be cut into the spaces between the cutting blades to thereby cut said article into column-like sections, knives positioned in the spaces between the fixed cutting blades and movable transversely thereacross to cut the column-like sections of the article into cubes, and means operatively connected to the plunger and to the movable cutting knives to move the plunger to advance the article to be cut into the fixed cutting knives, and to halt the movement of the plunger while the movable cutting knives are moved transversely relative to the fixed cutting knives and thereafter to continue the advance of the plunger through the fixed cutting knives to discharge the cut article therefrom and to withdraw the plunger from the fixed cutting knives.

4. In a machine of the character described, a plurality of frames arranged in separated parallel relation, each frame having a central opening therethrough, a series of knives intersecting each other at right angles and all disposed in a common plane over the opening in each frame, all of the knives in all of the parallel frames being in alinement to provide alined column-like spaces therethrough, knives movable through the spaces between the parallel frames on a plane parallel to the faces of the cutting blades, and means to impart an endwise movement to said movable knives.

5. In a dicing machine, the combination of a fixed cutting die, a hopper to supply material to be diced adjacent said cutting die, a plunger to force said material into and through said die, a cam, a rod connecting the cam to the plunger for moving the plunger toward the cutting die and stopping said forward movement before entry of the plunger into the die, means to rotate the cam, and a knife having its opposite ends reciprocatingly guided on the machine to be advanced across the cutting die at the moment of stoppage of the plunger to cut the material in the die, said plunger thereafter being entered into the die and withdrawn therefrom, and means connecting said knife to the cam rotating means to move in relation thereto.

6. In a dicing machine, the combination of a fixed cutting die, a hopper to supply material to be diced adjacent said cutting die, a plunger to force said material into and through said die, a cam, a rod connecting the cam to the plunger for moving the plunger toward the cutting die and stopping said forward movement before entry of the plunger into the die, means to rotate the cam, a knife having its opposite ends reciprocatingly guided on the machine to be advanced across the cutting die at the moment of stoppage of the plunger to cut the material in the die, said plunger thereafter being entered into the die and withdrawn therefrom, and means connecting said knife to the cam rotating means to move in relation thereto, and a gate movable in timed relation to the plunger to regulate the discharge of the material from the hopper toward the cutting die.

7. In combination, parallel tubular members each having cutting edges at one end in substantial alinement with its walls, knives normally lying wholly laterally of the marginal planes of said tubular members and mounted for movement transversely thereof whereby to leave said tubular members completely unobstructed, a reciprocably mounted plunger having a path of movement through said tubular members from a position spaced from the cutting edge ends thereof, and means for actuating said plunger, then said knives and thereafter said plunger to advance said plunger to the cutting edge ends of said tubular members, to move said knives transversely of all of said tubular members, and to force said plunger through said tubular members.

8. In combination, parallel tubular members each having cutting edges at one end in substantial alinement with its walls, knives normally lying entirely laterally of all of said tubular members and mounted for movement transversely thereof, a reciprocably mounted plunger having a path of movement through said tubular members from a position spaced from the cutting edge ends thereof, walls surrounding the space between said tubular members and said plunger when the latter is withdrawn from said tubular members and providing a loading space for said tubular members, and means for actuating first said plunger, then said knives and thereafter said plunger to advance said plunger to the cutting edge ends of said tubular members, to move said knives transversely of all of said tubular members and to force said plunger through said tubular members.

9. In combination, parallel tubular members each having cutting edges at one end in substantial alinement with its walls, knives normally lying wholly laterally of all of said tubular members and mounted for movement transversely of said tubular member, a reciprocably mounted plunger having a path of movement through said tubular members from a position spaced from the cutting edge ends thereof, walls surrounding the space between said tubular members and said plunger when the latter is retracted and providing a loading space for said tubular member, hopper means connected to said loading space and means for actuating said plunger, then said knives and thereafter said plunger to advance said plunger to the cutting edge ends of said tubular members, to move said knives transversely of all of said tubular members, and to force said plunger through said tubular members.

10. In combination, a hopper and a lower hopper chamber, parallel tubular members disposed in front of said chamber whereby material fed into the said chamber through said hopper will lie opposite the entrance end of said tubular members, each tubular member adjacent the hopper chamber having cutting edges at one end in substantial alinement with its walls, said cutting edges being disposed vertically and horizontally, the vertically disposed series of the cutting edges projecting beyond such other series, knives mounted for movement transversely of said tubular members, a reciprocably mounted plunger having a path of movement through said tubular members from a position spaced from the cutting edge ends thereof, and means for actuating said plunger, then said knives and thereafter said plunger to advance said plunger to the cutting edge ends of said tubular members, to move said knives transversely of all of said tubular members, and to force said plunger through said tubular members.

11. In a dicing machine the combination of means forming a charging chamber adapted to receive a mass of material to be diced, a plurality of angularly disposed relatively stationary guides forming a horizontally elongated cellular die structure having one end thereof connecting with the plunger chamber and the other end thereof forming a discharge, the forward edges of the die structure being formed as cutting edges, said horizontally disposed stationary guides being formed with transversely extending spaced slots, plunger means forming a plurality of plungers, one for each of the cells of the die, mechanism for moving said plunger means to a position to permit the plunger chamber to be charged and for advancing said plunger means to force the material therein into said cellular die passages to fill the same and a plurality of slicing cutters each adapted to shift transversely across a slot between the dies to cut the material therein into dice and means for thereafter further advancing said plunger means to discharge the diced material from said discharge end of the cellular passages.

12. In a dicing apparatus the combination of a plurality of angularly disposed guides disposed in spaced apart sets to provide intervening ways for the movement of slicing means, the passages formed by said guides of each set providing registering passages of elongated form, means forming a charging chamber disposed at one end of the die passages for receiving an indiscriminate mass of material to be diced, a plunger having a plurality of members each adapted to pass into an elongated passage of the registering die guides for forcing material from the charging chamber into the pasages, and means for advancing said plunger members to an initial position such that the material in the charging chamber is forced into the die passage-ways to fill the same, the forward edge of the plungers advancing into the passages formed by the guides adjacent the charging chamber a distance sufficient to fill such last mentioned passages with material corresponding with the width of material forced into the passages of the other die guides, a plurality of slicing cutters, each cutter being adapted to pass through a way between adjacent sets of die guides whereby to cut the material into uniformly shaped sections.

13. A die construction for a dicing machine comprising a plurality of angularly disposed stationary guides, each forming intervening cellular passage-ways of predetermined cross-sectional area, means for maintaining said plurality of guides in registering spaced-apart relationships to provide intervening slicing slots therebetween, and a cutting die therefor disposed in advance of said registering guides and having stationary angularly disposed cutting blades arranged to register with the guides, certain of said cutting blades being vertically disposed and wider than the other set to project beyond those blades which are angularly disposed relatively to the vertical blades, a hopper disposed above the vertical blades and arranged with a hopper wall substantially in line with the vertical cutting edges whereby said vertical blades guidingly feed material from the hopper into position in advance of said cutting dies.

14. In a dicing machine the combination of a support, a plurality of guide frames mounted therein, each guide frame having vertically and horizontally extending guiding blades therein providing a cellular arrangement of passages, each set or frame being spaced apart to provide intervening slots for the passage of a slicing knife, the guide blades of the first frame forming cutting edges, the vertical cutting edges extending forwardly of the horizontal cutting edges, a charging hopper disposed above said die frame with its front wall substantially in the vertical plane of the vertical cutting edges and means forming a plunger chamber to receive material from the hopper and a plunger adapted to force the material from the plunger chamber through the cellular passages formed by the cutting dies and guide dies.

15. In a dicing machine the combination of a plurality of horizontally disposed guide blades disposed in angularly arranged sets and interlocked to provide cellular elongated passages, the passages being provided with spaced apart transversely extending slots, the forward guide blades being sharpened to provide cutting edges, the walls of one of the cutting blades being wider than the walls of the other cutting blades to provide an imperforate side wall for strengthening the cutting blades, means forming a charging chamber in advance of the cutting blades and connecting with the cellular passages thereof and a plunger having a plurality of plunger members each adapted to be projected into a cellular passage and means for advancing the plunger initially to occupy a predetermined portion of each cellular passage formed by the cutting blades, means for thereafter passing slicing knives through the slots to cut the material into uniformly sized sections, and means for thereafter advancing the plunger members discharging all the material from the cellular passages.

16. In a dicing machine the combination of a plurality of relatively stationary guides disposed angularly to provide a cellular arrangement of passages, said guides being formed in spaced apart sets with an intervening transversely extending slot, a slicing knife for each slot and means for passing a slicing knife transversely across each slot, means for moving each slicing knife longitudinally as it passes across said slot to produce a slicing action and means for causing the material to be fed into the cellular passages and means for discharging the material from said passages after the same has been sliced by said slicing knives.

17. In a dicing machine the combination of a plurality of frames spaced apart to provide intervening slots, each frame carrying an arrangement of guides disposed in cellular formation to provide cellular passages, the passages of each frame registering to provide elongated passages, the edges of the forward guides being sharpened to provide cutters, plunger means for forcing material into all of said cellular passages to fill the same, cross heads disposed on opposite sides of said frame, means for reciprocating said cross heads, a plurality of spaced slicing knives connected to said cross heads, each one of said knives being disposed to pass through the intervening space between said frames to slice the column of material in each cellular passage into uniform cross-sections and a cam surface disposed to cooperate with one of said cross heads, and cam engaging means associated with said cross heads and with said cam surface whereby upon reciprocation of said cross head said knives are given a slicing action as they traverse said slots.

18. In a dicing machine the combination of a plurality of registering angularly disposed dies providing a plurality of elongated cellular die passages of predetermined cross-section, certain of said dies being sharpened to provide cutting edges, plunger means for forcing material into said dies, said dies being spaced apart to provide slots therebetween, slicing means adapted to traverse said slots to cut the material in said passages into predetermined shapes, power means for operating said plunger means and slicing knives, means for feeding material to be diced into position between said plunger means and said dies, and a slip clutch disposed in the connection between said power means, said plunger means, and said slicing knives for permitting continued operation of said power means upon the cessation of movement of the plunger means.

19. In a material dicing machine, the combination of means forming a cellular structure, the cells of which are substantially elongated relatively to their cross section, the end walls of the cells of the structure forming material cutting means, means for causing relative motion between material to be diced and said cellular structure whereby to cause the cutting means to cut the material into elongated cellular columns, said cellular structure being formed with transversely disposed spaced apart slots, additional cutting means comprising spaced cutting knives each adapted to move through one of said slots, means for automatically shifting said knives after the formation of said elongated columns whereby to cut the individual columns transversely into smaller pieces, plunger means supported in registration with the elongated cells of the structure, and means for moving the plunger means through said elongated cells after the movement of said spaced cutting knives transversely of said cells whereby to discharge the cut material from said cells.

20. In a material dicing machine, the combination of a plurality of angularly disposed strips forming a cellular structure having cutting edges at one side thereof, the cells of the structure forming parallel hollow columns, said cellular structure being formed with transversely disposed spaced apart openings, means for feeding material to be diced into registration with the cells of said structure, plunger means for relatively moving the material and cellular structure when in such registering position to form the material into a plurality of elongated columns, additional cutting means having a plurality of spaced apart cutting edges, each cutting edge being disposed in registration with an opening in said cellular structure, mechanical means for moving said additional cutting means in synchronized relation with and subsequent to the formation of said material into elongated columns to cause each said cutting edge to pass through an opening of said cellular structure to cut the columnar material transversely, and means for actuating said plunger means substantially through said cells of said structure for discharging the cut material from said cellular structure.

21. In a material dicing machine, the combination of a plurality of angularly-disposed strips forming a cellular structure having cutting edges at one side thereof, the cells of the structure forming parallel, hollow columns, said cellular structure being formed with transversely disposed, spaced apart openings, means for feeding material to be diced into registration with the cutting edges of the cells of said structure, mechanical means for relatively moving the material and cellular structure when in such registering position to cause the cutting edges to form the material into a plurality of elongated columns in said cells, additional cutting means having a plurality of spaced apart cutting edges, each cutting edge being disposed in registration with an opening in said cellular structure, mechanical means for moving said additional cutting means to cause each said cutting edge to pass through an opening of said cellular structure to cut the columnar material transversely, plunger means, and mechanical means for actuating the plunger means to cause it to enter the cutting edge sides of said cells and pass substantially through said cellular structure subsequent to the movement of said additional cutting means for discharging the cutting material from said cellular structure.

22. A dicer comprising a cellular structure, the walls defining the cells thereof being sharpened at one end of the structure to form cutting blades, means for feeding articles by gravity to one end of the cellular structure, abutment means for maintaining said articles in said predetermined position, knife means movable through said cellular structure transversely with respect to the longitudinal axis of the cells of said structure, an intermittently operated drive means for moving said cellular structure and said abutment means relatively a predetermined distance to force said article past the cutting blades into the cellular structure to sever the article into column-like sections and to maintain said abutment means and said cellular structure against relative movement while the knife means are moved transversely of the cellular structure to cut the column-like sections of the article into cubes and thereafter to further move said cellular structure and said abutment means relatively to discharge said cubes from the cellular structure.

23. A dicing device for dicing fruits or vegetables comprising at least three spaced apart cellular sections arranged to provide angularly disposed side walls forming substantially uniformly arranged symmetrical passages extending in registration, the edge portions of one of the end cellular sections being sharpened to provide cutting edges, a plurality of parallel slicing knives disposed in spaced relation, means for moving said slicing knives entirely across the cross sectional area of the tubular passages formed by the cellular sections for slicing into shorter sections of predetermined length the columnar material formed by the cellular sections, means for feeding uncut material to the cellular sections at that end at which the cutting edges are located, and plunger means operating first to force the so fed material into the tubular passages prior to the passage of the slicing knives thereacross and thereafter operating to enter the tubular passages and force the material therefrom.

HERBERT E. GRAY.